(12) United States Patent
Hollitt et al.

(10) Patent No.: US 6,616,902 B1
(45) Date of Patent: *Sep. 9, 2003

(54) FEED PROCESSING FOR IMPROVED ALUMINA PROCESS PERFORMANCE

(75) Inventors: Michael Hollitt, Graceville (AU); Stephen Grocott, Sunnybank Hills (AU); Gerard Roe, Preston (AU)

(73) Assignee: Comalco Aluminium Limited, Brisbane (AU)

( * ) Notice: Subject to any disclaimer, the term of this patent is extended or adjusted under 35 U.S.C. 154(b) by 0 days.

This patent is subject to a terminal disclaimer.

(21) Appl. No.: 09/763,065

(22) PCT Filed: Aug. 17, 1999

(86) PCT No.: PCT/AU99/00663

§ 371 (c)(1), (2), (4) Date: Apr. 25, 2001

(87) PCT Pub. No.: WO00/10919

PCT Pub. Date: Mar. 2, 2000

(30) Foreign Application Priority Data

Aug. 1, 1998 (AU) .............................................. PP5314

(51) Int. Cl.$^7$ ............................................... C22B 21/00
(52) U.S. Cl. ...................... 423/121; 423/122; 423/123; 423/124; 423/127; 423/130; 423/625
(58) Field of Search ................................. 423/121, 122, 423/123, 124, 127, 130, 625, 629

(56) References Cited

U.S. PATENT DOCUMENTS

| 2,915,365 | A | * | 12/1959 | Saussol |
| 3,227,521 | A | * | 1/1966 | Carithers et al. |
| 3,265,465 | A | * | 8/1966 | Turpin |
| 5,141,734 | A | * | 8/1992 | Misra et al. |

* cited by examiner

*Primary Examiner*—Steven Bos
(74) *Attorney, Agent, or Firm*—Miles & Stockbridge P.C.; John C. Kerins

(57) ABSTRACT

A process is disclosed for the treatment of an alumina process feedstock prior to transferring the treated feedstock to an alumina process for extracting refined alumina from the treated feedstock. The treatment process includes the following steps: (a) heating the alumina process feedstock to a temperature of 400C. to 650C. by direct contact with combustion gases, and (b) cooling the heated feedstock to a temperature at which it can be handled and fed to the alumina process. The treatment process is characterised by controlling the contact time of the solid alumina process feedstock at temperatures in the above range in step (a) to less than 5 minutes.

32 Claims, 1 Drawing Sheet

FEED PROCESSING FOR IMPROVED ALUMINA PROCESS PERFORMANCE

This invention relates to the improvement of the mineralogical and chemical composition of naturally occurring and synthetic alumina process feedstocks. The invention is particularly suited to the enhancement of boehmitic bauxites used in the production of alumina and alumina chemicals, especially by the Bayer process.

Embodiments of the present invention have the common feature of heating of the alumina process feedstock to bring about thermal dehydration and removal of organic carbon or conversion of organic carbon to a form which is not extractable in the aqueous phase digestion of the alumina process feedstock. Additional steps may be employed as will be described below.

The dominant technology for the extraction of refined alumina from alumina process feedstocks is the Bayer process. In the Bayer process alumina is extracted from alumina process feedstock (most frequently in the form of bauxite) by contacting the milled alumina process feedstock with hot caustic solution, generally under pressure, to dissolve alumina therefrom. If the alumina process feedstock contains mainly gibbsite (a mineral form of alumina trihydrate), extraction of alumina from the bauxite may be conducted using a caustic solution at a temperature generally in the range 100 to 175C. If the alumina process feedstock contains mainly boehmite, or diaspore (mineral forms of alumina monohydrate) higher temperatures, in the order of 200 to 300C. are generally required. The higher temperature digestion is required in these cases because the monohydrate forms act to cause instability of caustic solutions containing the high levels of dissolved alumina desired for subsequent processing unless there is a high degree of elimination of these forms by digestion at temperatures where such liquors will be stable. High temperature digestion comes with significant equipment cost disadvantages, in a much larger liquor heating and flashing system (e.g. 11 stages compared with 3) and in more expensive materials and specifications for construction. For mixed trihydrate and monohydrate forms, as is the case for many naturally occurring bauxites, a double digestion process, in which residues from a lower temperature first stage digest are further digested in a higher temperature second stage digest, may be used.

After digestion the digestion solid residue/pregnant caustic liquor mixture is brought back to atmospheric pressure by flashing to boil off water. The solid residue (usually referred to as red mud) is separated from the pregnant, caustic aluminate bearing liquor, usually by a combination of settling or filtration and washing, with both pregnant liquor and wash liquor clarified through pressure filters. The clarified combined liquor is fed to a precipitation circuit where it is cooled and seeded with solid particles of alumina trihydrate to induce precipitation of solid alumina trihydrate from the liquor. The resulting precipitation slurry is separated into a spent liquor stream and solids streams graded by particle size, by settling, cycloning or filtration, or combination of these processes. Coarse solids represent product, and are washed and transferred to a calcination stage where they are calcined to produce alumina. Intermediate and.fine solids are separately returned to the precipitation circuit, frequently after at least crude deliquoring, e.g. in cyclones or filters, for agglomeration and to provide seed.

The fine seed is normally washed prior to recycle to precipitation, either to remove solid phase oxalate precipitated with the alumina (which would interfere with the incorporation of the fine material into composite coarse particles in the precipitation process), or to remove organic compounds which would otherwise render the seed less active.

The spent liquor is returned to the digestion step, normally after some reconcentration by evaporation, where it is contacted with further milled alumina process feedstock.

The Bayer process has been used commercially for about 100 years and is well known to persons skilled in the art.

Alumina process feedstocks, particularly bauxites, include a range of impurities in addition to the hydrated forms of alumina. The main impurities are compounds of iron, titania and silica, which, while having various deleterious effects in the Bayer process, including on consumables such as flocculants, lime and caustic soda, and on scale formation and product quality, deport predominantly to the solid mud residue.

Despite its presence at only low levels in typical Bayer process feeds, extractable organic carbon (0.02% to 0.35%) is an impurity of major significance. Organic compounds, carbonates and oxalates derived from organic carbon in the feedstock have the capacity to accumulate in the circulating liquors, sequestering caustic soda which could otherwise have delivered alumina from digestion to precipitation, and therefore severely impacting on the productivity of the process. While carbonates and oxalates can be removed from the circuit by causticisation of various wash liquors or precipitates with lime, a reduction in the level of other organic carbon derivatives can only be achieved by either pressure oxidation (which comes with explosion hazards and generates large quantities of oxalate and carbonate which then must be removed), or bleeding off of caustic solutions, for either neutralisation and disposal (which is major economic burden through caustic make-up costs) or for concentration by evaporation followed by destruction by combustion (which has high energy and capital costs). Organic compounds also interfere with the precipitation process (by adsorption onto active sites on the seed, having a seed poisoning effect) and carry soda as a contaminant into the precipitated product. Oxalate derived from organic carbon is relatively insoluble, and can precipitate as sodium oxalate with the alumina trihydrate, interfering with product size, morphology and chemistry, and reducing resistance to particle attrition. Because these effects lead to the necessity to ensure that oxalate is not precipitated in the same precipitation tanks in which fine alumina is to be cemented into composite particles by the early portion of the precipitating alumina hydrate, and because oxalate stability above its solubility is a strong inverse function of liquor strength, the caustic strength available for carrying alumina is also limited in most alumina refineries by the input of oxalate precursors and oxalate generated by oxidation of other organics.

That is, organics in alumina process feeds are in large measure responsible for establishing the limits to productivity in the Bayer process, by setting the maximum level of soda in liquor, determining the extent to which this soda is sequestered from its useful purpose of delivering alumina, and acting as poisons for the precipitation process.

The impact of monohydrate alumina in alumina process feeds in driving the need for high temperature digestion has already been mentioned. Some other impacts of monohydrate alumina should also be mentioned. Digestion of alumina process feeds at high digestion temperatures results in side reactions (such as production of titania phases) which reduce digestion efficiency. For this reason lime addition is frequently made. The consumption rate of lime for this purpose and for causticisation and oxalate destruction is sufficient to justify the construction of dedicated lime kilns in many environments. Also, the digestion temperature is frequently limited by the pressures at which boilers can operate safely and effectively, which results in a greater limitation on liquor alumina concentration for high temperature digestion than for low temperature digestion, given the instability of high alumina concentration liquors in the presence of solid residues which still contain destabilising monohydrate alumina. Thus digestion of monohydrate alumina bearing alumina process feeds is naturally less productive than digestion of alumina bearing feeds with little or no monohydrate alumina. To make up for this shortcoming some alumina processing plants inject alumina bearing feeds having little or no monohydrate alumina into the cooling digestion liquors in the flashing vessels at temperatures and for contact times for which monohydrate alumina in high temperature digestion residues will not quickly cause liquor decomposition. This process is known as sweetening. The process adds significantly to processing complexity, requiring a separate milling and slurrying system for the injected feed having the low content of monohydrate alumina. Since important reactions which result in silica in feedstock forming solid sodium aluminosilicates (and therefore deporting to residues) cannot be completed at the times and temperatures of liquor/solids contact for the injected feedstock the sweetening process also elevates the level of dissolved silica in digestion liquors, causing elevated levels of silica subsequently precipitated with the alumina hydrate, and scaling problems in evaporation, alumina process feedstock slurrying, and liquor and slurry heating. To prevent scaling problems an aluminosilicate seeded desilication operation after hydrate precipitation may be added to the flowsheet.

Further, high temperature digestion results in conversion of a substantial proportion of any quartz in the alumina process feedstock to sodium aluminosilicate, which deports to the digestion residue along with sodium aluminosilicate formed from more reactive forms of silica. Quartz is not significantly digested in low temperature digestion. Alumina process feedstocks having high contents of monohydrate alumina will, for an equivalent quartz and total silica content, consume more caustic soda, requiring greater make up of this expensive chemical. Further, such feedstocks will normally therefore benefit from treatment for the removal of liberated quartz particles prior to supply to the alumina refining process, at a further cost and process complexity, and usually for considerable loss of mineral values.

Another influence of high temperature digestion is the conversion of some iron in the alumina process feedstock to soluble and colloidal forms which are able to pass through the clarifying system and deport in large measure to the precipitated alumina hydrate. The iron content of alumina hydrate, along with the silica content, is an important determinant of the value of the calcined hydrate to aluminium smelter customers, as it affects the quality of high purity metal which can be made. The combination of high iron in clarified liquors (driven by monohydrate alumina in the alumina process feedstock) with low alumina yield in precipitation of alumina hydrate (driven as indicated above by organic impurities in the alumina process feedstock as well as the monohydrate alumina in the alumina process feedstock) is potentially very damaging for product quality, especially when combined with the implications for silica in hydrate of a sweetening process.

It will be apparent from the above discussion of the Bayer alumina refining process that there are two properties of an alumina process feedstock which have the dominant influence on complexity, and productivity in the Bayer process to which it is fed, as well as a significantly negative influence on hydrate product quality and a further negative influence on construction and operating costs, especially consumables costs. The first is the monohydrate alumina content, and the second is the content of extractable organic carbon (including oxalate precursor organics and hydrate seed poisons).

With the exception of processes involving high temperature reaction of the alumina process feedstock with or without reagents at high temperatures (see below) prior art processes for dealing in part with the latter of these problems, namely extractable organic carbon, are universally dependent on the treatment of a side stream of caustic liquors in the Bayer process for removal and destruction of compounds derived from the organic inputs. In one prior art process a side stream of caustic liquor is evaporated and mixed with a stream of alumina bearing dust and recycled solid calcined material before being fed to a high temperature calcination process in which all organic matter is destroyed by pyrolysis and combustion processes. The solid calcined product, consisting primarily of sodium aluminate, is divided into product and recycle components. The product component is either recycled into the Bayer process for dissolution, thereby recovering alumina and soda components, or used for dissolution for the production of specialty alumina hydrate products.

In another prior art process pressurised industrial oxygen is injected into circulating high temperature digestion liquors (possibly as a side stream, but also possibly in the main stream) to have the effect of conversion of organic impurities to oxidised gaseous species, and dissolved sodium carbonate, simpler organic compounds, and sodium oxalate. This process is always coupled with side stream processes for the removal of products of pressure oxidation, such as by causticisation with lime for the removal of carbonate, and side stream "salting out evaporation" in which a side stream is evaporated essentially to a cake of sodium salts including aluminate, carbonate, oxalate and organic compounds. This cake is either disposed of, or subjected to thermal decomposition for recovery of sodium and alumina values.

Oxalate removal from the circuit is also conducted on a side stream, either the fine seed wash liquors or a stream of solid oxalate made by crystallisation from an evaporated side stream of spent liquor. The oxalate is reacted with lime to produce a calcium oxalate precipitate which is disposed of with red mud or, in the case of solid oxalate, can be thermally decomposed, usually in a process for destruction of other organics contained in concentrated liquors.

Removal of carbonate by reaction with lime is also conducted on a side stream, in this case the wash liquors from solid residue washing.

The difficulty with side stream processing for the removal of organics and their derivatives such as carbonate and oxalate is that side stream processing can only be effective if these impurities have already reached a high level, usually already having a significant nuisance value, in the main liquor circuit through digestion and precipitation. The effectiveness of these processes in purifying liquors is limited because an enduring problem must already exist for these processes to be effective in reducing what would otherwise be a larger problem.

A process involving thermal treatment of a predominantly trihydrate alumina process feedstock at sufficient temperatures to result in partial elimination of organic carbon by pyrolysis and thermal oxidation has been described by Rijkeboer, along with a literature review of the art. In this process trihydrate alumina is dehydrated and the level of organic material which is extractable in caustic solutions is significantly reduced. Specifically referred to are the patents of Kobayashi and Brown. Each of these prior art documents disclose that such thermal treatments, if properly applied, can result in no loss of alumina extractability compared to the original gibbsitic bauxite. Kobayashi indicates that success lies in maintaining a molar ratio of bound water to alumina (Al2O3) below 0.5. Brown specifically requires temperatures to be maintained in the range 300C. to 400C. for 10 to 120 minutes. Rijkeboer demonstrates that even with a test for extraction which provides for an optimistic view of extraction in the Bayer process (since it commences with pure caustic soda liquors instead of simulated spent Bayer liquor) the conditions indicated by Brown result in loss of extraction in realistic thermal processing equipment through the conversion of trihydrate alumina in feed to monohydrate alumina in the form of boehmite. Rijkeboer recommends a final temperature range of 400 to 600C. and a retained chemical water below that of Kobayashi's limitation. He also indicates that a limitation to the process if extractability is not to be adversely affected is that the highest temperature treatment should be conducted at water vapour pressures of less than 2 kPa. This limitation is extreme from an industrial processing point of view, since most industrial fuels will, upon combustion to introduce sufficient heat for dehydration at the required temperature, produce water vapour levels in combustion gases in excess of 2 kPa. Therefore the only means of conducting the process would be by heat transfer via heating elements which are themselves heated either electrically or via the combustion of fuel. For industrial processes treating at least hundreds of thousands of tonnes (and most probably millions of tonnes) of feed per year the required heat transfer area (of the heating elements) will not result in an economically attractive outcome. Further, the water vapour pressure associated with completion of dehydration of the feed will be higher than 2 kPa unless there is very high dilution with air or some other gas, which even should heating via heating elements be used would result in the generation of large quantities of hot gases from which heat recovery in preheating and drying the feed would not be practical. Consequently none of the thermal processes proposed in the prior art which would have the impact of removal of organic matter accompanied by thermal dehydration while not significantly affecting the extractability of alumina from alumina process feeds can be operated under industrially realistic conditions.

There is also prior art reference (Russell, 1955) to the extraction of monohydrate alumina in the form of boehmite by heating boehmite in air to lower water content forms of hydrated alumina, conducted in such a manner that the product could be dissolved to a greater extent in hot caustic solutions than the original monohydrate alumina. However, since most alumina process feedstocks contain both monohydrate and trihydrate forms, and this prior art did not include conditions for the simultaneous dehydration of monohydrate and trihydrate forms which would not affect the properties of the trihydrate decomposition product, and there was no attempt to ensure that a significant water vapour pressure was present, the disclosure did not in any way overcome the problem identified by Rijkeboer of water vapour sensitivity. This disclosure did not therefore indicate an industrially realistic means of enhancing the performance of monohydrate in alumina process feeds which normally contain trihydrate alumina as well, or of removing organic compounds under such industrially realistic conditions.

There is no known industrially realistic prior art process which presents a solution to the problems caused by monohydrate alumina in alumina process feedstocks save for processes which react the alumina process feed with other chemical reagents including soda (or soda ash) and lime (or limestone) at high temperatures. These processes are generally applied to alumina process feeds having high contents of silica which would digest and consume soda as sodium aluminosilicates in the Bayer process operated without this additional step. The processes produce calcium silicates (as by-products) in place of sodium aluminosilicates, and virtually all of the hydrated alumina (both trihydrate and monohydrate) in feed is converted to sodium aluminate. For alumina process feeds containing up to about 10% silica it is generally more economic to apply the Bayer process. That is, for most alumina process feeds these processes come with a significant economic penalty, in capital costs and in energy consumption.

The need for an industrially realistic process which can significantly improve an alumina process feedstock containing both organic carbon and monohydrate alumina so that the many negative implications of these characteristics for alumina refinery complexity and capital costs has been clearly recognised in the prior art. Virtually all processes which have been proposed to meet this need are deficient, either in not completely resolving the alumina refining difficulties, or in coming with a net economic penalty, or in adding net alumina refining complexity, or in being impractical for realistic industrial application in an alumina refining context.

The present inventors have now proposed a process which is effective in meeting the need which has been identified, but without any of the above deficiencies.

Figure 1:
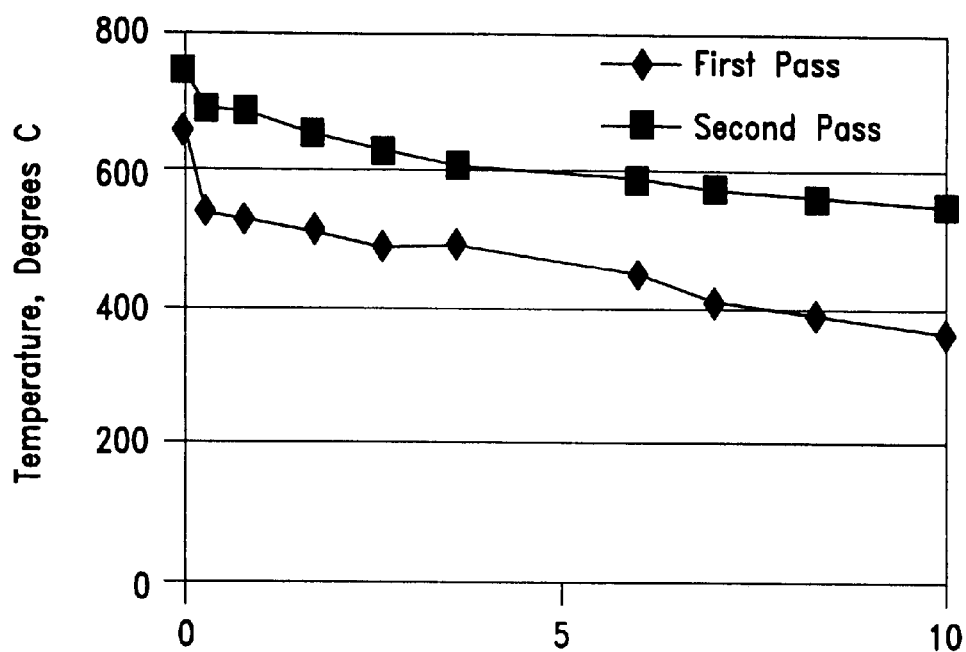
FIG. 1 is a graph illustrating the gas/solids temperature profiles for each pass through a calciner in accordance with Example 2 presented in the specification.

Accordingly, the present invention provides a process for the treatment of alumina process feedstocks for the Accordingly, the present invention provides a process for the treatment of alumina process feedstocks for the simultaneous enhancement of achievable alumina digestion per unit of spent liquor and reduction in extractable organic carbon, which process comprise the following steps:

(a) heating of the alumina process feedstock to a temperature of 400C. to 650C. by direct contact with combustion gases, and (b) cooling of the heated feedstock to a temperature at which it can be handled and fed to the alumina process, and which process is characterised by controlling the residence time of the solid alumina process feedstock at temperatures in the above range to ensure decomposition of trihydrate alumina and monohydrate alumina present, by dehydration, while not:

(i) substantially forming monohydrate alumina from trihydrate alumina, or (ii) reducing residual bound water to the extent that extraction is adversely affected, or (iii) allowing sufficient time for contact with water vapour that slower water vapour dependent loss of extractability is experienced.

The present inventors have surprisingly found that by limiting the contact time between hot, water vapour bearing gases and the alumina process feedstock while observing the above temperature limitations the extractable portion of organic carbon can be very significantly reduced, monohydrate alumina can be largely extinguished and trihydrate alumina can be converted to a more readily extracted and soluble form.

Preferably the contact time is less than five minutes.

More preferably the contact time is less than one minute.

Most preferably the contact time is less than 10 seconds.

It has been discovered that the process of the invention is less affected by water vapour as the contact time in the temperature range indicated is reduced, until in the contact time range of 1 to 10 seconds there is no measurable effect of increased water vapour pressure. At longer contact times water vapour pressure has an increasing effect until at contact times beyond about five minutes water vapour has a significantly detrimental effect on alumina extractability. Even at the shortest contact times it is possible to achieve almost complete elimination of monohydrate and trihydrate alumina (forming dehydrated products which are essentially X-ray diffraction amorphous) and to convert the dominant proportion of organic carbon to forms which either enter the off gases or are not extractable and will not form oxalates or carbonates.

It is further herein disclosed that for these desirable short contact times it is beneficial to control the particle size distribution of the alumina process feed which is subjected to heating. Larger particle sizes having a larger thermal mass per unit surface area and a larger diameter over which conduction needs to be effective will take longer for the heating effect to penetrate to the core, exposing the outer shells of the particles to higher temperatures for longer times in contact with water vapour. At the same time finer particles will quickly be heated, and possibly be overheated, so that contact time at temperature for these particles should ideally be shorter. Thus, preferably the average particle size of the alumina process feedstock is relatively fine to ensure that particle shells are not overheated or otherwise affected by water vapour. Further, preferably the particle size distribution is narrow, so that very fine particles are not overheated or otherwise affected by water vapour while the thermal treatment of the cores of the coarser particles is completed. Over grinding is to be avoided, as it is a cost for little return, given that alumina refining processes can usually process feedstocks which would predominantly pass a 1 mm aperture, and the present process can work quite effectively for materials having this size specification. Materials having a coarser specification will normally need to be reground following the present process before feeding to the alumina refining process. Thus the best degree of milling is that which will just suit the desired size specification for the alumina refining process, performed in such a manner that an excessive amount of fine material is not produced.

Preferably the alumina process feed is milled so that it does not contain more than a few percent by weight, more preferably no more than 5 wt %, of particles retained on a 5mm aperture.

More preferably the alumina process feed is milled so that it does not contain more than a few percent by weight, more preferably no more than 5 wt %, of particles retained on a 2mm aperture.

Most preferably the alumina process feed is milled so that it does not contain more than a few percent by weight, more preferably no more than 5 wt %, retained on a 1 mm aperture.

Preferably unless predominantly ground to pass a 100 micron aperture the alumina process feed fed to the present process does not contain more than about 30% by weight of material which would pass a 20 micron aperture.

More preferably unless predominantly ground to pass a 100 micron aperture the alumina process feed fed to the present process does not contain more than about 20% by weight of material which would pass a 20 micron aperture.

Most preferably unless predominantly ground to passing a 100 micron aperture the alumina process feed fed to the present process does not contain more than about 10% by weight of material which would pass a 20 micron aperture.

Milling can be conducted in any suitable device. For example it may be conducted wet or dry, in rod or ball mills, semi-autogenously, in rolls or pressure rolls crushers, in roller mills or in vibro-mills. While the desired control of particle size distribution will best be achieved by milling in closed circuit with a classifying device the need for this will depend on the fracture characteristics of the alumina process feed, i.e. the degree to which it has a tendency to be overground in open circuit milling.

If conducted dry, then closed circuit milling will beneficially be carried out in an air swept device, such as a roller mill or a rod, ball or semi-autogenous air swept mill. In this manner hot gases from the heating step can be used for drying and milled product transport purposes, with associated economies in equipment and energy costs.

The heating/gas contacting step (a) can be carried out in any device which is suitable for the contacting of fine granular materials with combustion gases mixed with preheated air for short and well controlled contact times followed by gas solids separation. Stationary (bubbling and spouting) fluidised beds will suit the longer contact times within the suitable range, circulating fluidised beds will suit the intermediate contact times, and will assist in the control of residence time according to particle size by allowing pneumatic classification prior to circulation of the coarser solids for recontacting with fresh gases, and flash and cyclone contacting systems, including gas suspension calciners with cyclone preheaters, will suit the shorter contact times for finer and more narrowly distributed particle sizes.

Further, it is herein disclosed that the final heating and gas contacting of solids within the critical temperature range can be preceded by one or more preheating steps which bring about some thermal dehydration, reducing the thermal load, water vapour pressure and the necessary contact time in the final heating and gas contacting step. These one or more preheating steps can optionally be conducted in any of the above devices by contact with the exit gases from the final gas contacting step or from a later stage of preheating. In this manner countercurrent heat exchange can be conducted, with advantages for process fuel consumption, and the alumina process feedstock can be carefully conditioned so that naturally occurring variations in its properties have less influence on the product of the process. There is no significant practical constraint within the above context on contact time or water vapour pressure in these lower temperature heating steps, although very long times at low temperatures can produce some monohydrate alumina (which will nevertheless still decompose in the final gas contacting step).

Product cooling can be conducted in any practical manner. It is not necessary to cool to ambient temperature, as some of the heat in the product can be used in heating of alumina refinery liquors, saving some energy. Direct cooling to a suitable temperature (probably 100 to 200C.) using air which is preheated for process use (either as preheated combustion air, as a heat carrier from the final stage into preheating stages, or as directly added hot air into preheating or drying stages) will be a most effective manner of product cooling, as indirect cooling techniques require heat transfer across exchange elements, adding significantly to process complexity and equipment costs. However, indirect cooling can be applied without any other necessary disadvantage, if desired, either with or without heat recovery from the cooling fluid.

In another aspect of the present invention it is also possible to divide alumina process feeds according to their suitability for introduction to the process at different points having different conditions. It is herein disclosed that of the decomposition products of trihydrate alumina and monohydrate alumina it is the decomposition product of trihydrate alumina in alumina processing feedstocks which has the greatest extractability, and whose extractability is the most sensitive to process conditions, including water vapour sensitivity and overheating sensitivity. Thus the most vulnerable component of a feed to loss of potential extractability is the trihydrate alumina in the finer fractions of the feed. Further, trihydrate alumina can be suitably decomposed under milder temperature and contact time conditions than monohydrate alumina, under which conditions its decomposition product is less vulnerable to loss of potential extractability.

In the present process, in which there is heat exchange between hot gases and feed solids, it is possible to select a location in the process of this heat exchange where the gases are sufficiently cool that there is much reduced potential for loss of extractability by use of these gases to decompose a fine trihydrate alumina bearing, or trihydrate alumina rich feed, while at the same time introducing a coarse monohydrate bearing feed to consume heat in the process of decomposition at a higher temperature location. Thus in a cocurrent heating step, such as in a gas suspension or flash calcination device, the temperature sensitive fractions can be introduced downstream in the hot gases from the introduction of the high temperature demanding (e.g. coarse monohydrate bearing) fractions, so that the temperature sensitive fractions are at no point exposed to the highest temperature conditions.

In yet another aspect of the present invention, where there is a mismatch between the short gas/solid contact time necessary for decomposition of trihydrate or monohydrate alumina in the alumina process feedstock and the time required at high temperature for the desired or most effective removal of organic matter it is possible to allow the solids to be retained for additional time at elevated temperature after separation of the product of the highest temperature stage of the process from the water vapour bearing gases, e.g. in an insulated rotary drum, in a high temperature storage silo or in a fluidised bed, prior to cooling. Experience with the presently disclosed process is that longer times at elevated temperatures have the effect of lowering the total carbon content of the product, but have a much smaller influence on the content of carbon which is extractable in the alumina refining process, since even short residence times have the effect of rendering whatever remains of carbon compounds derived from organic matter in the feed resistant to extraction. Therefore it will not normally be necessary or beneficial to incorporate such a holding step into the present process.

The presently disclosed process forms part of the chain of processing of alumina process feedstocks which embraces mining through to finished alumina. Accordingly in another aspect the present invention provides a Bayer process which includes the presently disclosed process. There will be many modifications of the present invention which can be made to suit the particular characteristics of the feedstock and the installed technology base in this processing chain which will become apparent from the present process description to those skilled in the art of alumina feedstock processing and alumina refining. Other modifications will become apparent from the present process description to those skilled in the art of thermal processing of solid granular material or heat transfer. Such modifications as these are intended to fall within the scope of the appended claims.

EXAMPLES

Example 1

A sample of beneficiated, dried, milled and screened (−1.0 mm +0.3 mm) Weipa bauxite having the composition provided in Table 1 was fed continuously at 11.5 kg per hour to an externally heated 150 mm diameter laboratory fluidised bed which was fluidised with preheated air. The fluidised bed discharged by overflow, and the product was immediately collected in an enclosed vessel, and allowed to cool.

TABLE 1

| Weipa Bauxite Feed In Example 1 | |
|---|---|
| % $Al_2O_3$ | 56.0 |
| % $SiO_2$ | 2.8 |
| % LOI | 24.7 |
| % $Fe_2O_3$ | 13.2 |

The weight of solids in the fluidised bed, expressed on a feed basis, was determined as 2.5 kg, for an average solids residence time in the fluidised bed of about 11 minutes. The fluidised bed was maintained at a temperature of 540C. The fluidising air was introduced at a rate sufficient to provide a superficial velocity across the bed diameter of 0.7 metres per second at the bed temperature.

Two such tests were performed, one (Test 2) in which water was deliberately injected into-the base of the fluidised bed to produce a water vapour pressure in the fluidising gases of 18 kPa, the other (Test 1) in which the water vapour pressure consisted only of that naturally obtained by the decomposition of the bauxite and the moisture content of the fluidising air (totalling approximately 5 kPa).

The products of the decomposition tests were as recorded in Table 2.

A weighed sample of each of the products was introduced into a small pressure vessel with 100 mL of synthetic spent Bayer liquor (caustic strength 280 gpL, expressed as sodium carbonate, sodium carbonate strength 30 gpL, alumina concentration 112 gpL $Al_2O_3$). The amount of

TABLE 2

| Products In Example 1 | | |
|---|---|---|
| Water Vapour Pressure, kPa | Test 1<br>5 kPa | Test 2<br>18 kPa |
| % $Al_2O_3$ | 71.7 | 71.8 |
| % $SiO_2$ | 3.6 | 3.5 |
| % LOI | 3.7 | 3.8 |
| % $Fe_2O_3$ | 16.7 | 16.9 |
| % Extraction | 85.6 | 81.2 | sample added depended on its chemical analysis, and was determined in such a manner that if all of the alumina available for digestion was to be digested then the final alumina concentration would be in gpL 74% of the final caustic strength (expressed as sodium carbonate) in gpL. The cylindrical pressure vessel was then sealed and heated to a contents temperature of 175C. for 30 minutes, during which time it was rotated circumferentially at 70 rpm. At the end of this time the vessel was quenched in a flow of cold water, and the contents were subjected to solid/liquid separation, with the solids washed, weighed and chemically analysed. From the analysis the extent of extraction of the alumina which was available for extraction was determined. This value is recorded in Table 2. Liquor analysis for organic carbon and oxalate formation, related back to the bauxite, indicated organic carbon and oxalate formation from the treated bauxite which were below the detection limit of the method used for analysis. The comparative values for the original bauxite were 0.20% and 0.9kg per tonne of bauxite.

The above extraction test is a sensitive test of the extractability of the alumina in the feed, since it is conducted at relatively low temperatures for an originally boehmitic (monohydrate alumina bearing) bauxite, and a high alumina concentration relative to caustic concentration is targeted. In such a test applied to the original bauxite the extraction on the same basis is less than 80% of the available alumina. The higher extractions for the treated samples were somewhat further enhanced by extension of the digestion to two hours, which is not the observed behaviour for digestion of monohydrate bearing alumina process feeds, for which initial liquor alumina concentrations are not sustained with increasing time, due to decomposition onto monohydrate seed crystals in the digestion residue. No trihydrate alumina, monohydrate alumina or other crystalline decomposition product of monohydrate or trihydrate alumina was detectable by X-ray diffraction in either the product of processing or the digestion residues.

Similar tests conducted for a gas/solids contact time of 5 minutes resulted in a very similar influence of water vapour, for very similar extraction effects.

This example demonstrates the effects of the process, of reduction in organic carbon inputs to alumina refining processes and of improved extractability in relatively low temperature digestion in the Bayer process. It also demonstrates that while at these gas solids contact times water vapour does not eliminate the benefits of the process it does have a substantial deleterious effect.

Example 2

A sample of beneficiated, dried and milled Weipa bauxite having the composition essentially the same as that in Example 1 and the particle size analysis provided in Table 3 was fed continuously at 40 kg per hour to an externally heated 150 mm diameter pilot flash tube calciner in which it was conveyed for a distance of 9.8 metres with preheated air produced by mixing air with the combustion products of propane. At four points along the length of the flash tube (at 1.8 m, 3.8 m, 6.0 m, and 7.1 m) further propane burners were used to introduce hot combustion gases to compensate for heat losses in this small scale equipment. The product solids which were separated from the flash calciner discharge gases by cyclone were collected in a 200 L drum and allowed to cool.

TABLE 3

Weipa Bauxite Feed In Example 2

| % $Al_2O_3$ | 56.0 |
| --- | --- |
| % $SiO_2$ | 2.8 |
| % LOI (bound water) | 24.7 |
| % $Fe_2O_3$ | 13.2 |

| | Cum % retained |
| --- | --- |
| +1 mm | 2% |
| +0.5 mm | 33% |
| +0.1 mm | 72% |
| +0.02 mm | 87% |

The contact time of the solids in this system was similar to the gas residence time, which itself depended on the average gas velocity. The Weipa bauxite, which contains both monohydrate and trihydrate forms of alumina, was passed through this arrangement twice, once at lower temperatures for preliminary dehydration, as would occur in feed preheaters, and once at higher temperatures for completion of dehydration to produce the desired product. In each pass an average gas velocity of 8 metres per second was used. The gas/solids contact time for each pass was therefore 1 to 2 seconds. The temperature profile for each pass is recorded in FIG. 1.

A test was performed in which water was deliberately injected into the combustion gases of the flash tube to produce a water vapour pressure in the incoming gases of 26 kPa.

The product of the first pass retained 10.5% LOI, while the product of the second pass retained 4.3% LOI. This final product was subjected to digestion testing in the same manner as that described in Example 1, for an extraction of available alumina of 88.7%. Extractable organic carbon in the products was at or below 0.01%, and the oxalate formation rate was approximately 0.045 kg per tonne of the original bauxite. No trihydrate alumina, monohydrate alumina or other crystalline decomposition product of monohydrate or trihydrate alumina was detectable by X-ray diffraction in either the product of processing or the digestion residue.

The important conclusion from this test when compared with the test in Example 1 is that in systems having very short gas/solids contact times at temperatures in the range 350 to 700C. there is no significant detrimental effect of water vapour pressure on product properties, particularly extractability. Very short contact times are effective in the dehydration of bauxite for the extinction of monohydrate alumina and for the conversion of organics to inextractable forms without loss of extractability by deactivation of decomposed trihydrate alumina.

Example 3

The same beneficiated, milled and dried bauxite as was used in Example 2 was processed at 0.6 tonne per hour feed rate through a countercurrent gas contacting arrangement consisting of three flash preheating tubes, with gas/solids separation between stages by cyclones, followed by a flash calciner, also equipped with a cyclone for gas/solids separation. The gases from the flash calciner were conducted after gas/solids separation to the third flash preheating tube for mixing with solids from the second flash heating stage, and then, after further gas/solids separation to the second flash preheating tube for mixing with the solids from the first flash heating stage, and finally, following yet another step of gas/solids separation, to the first flash preheating tube for mixing with fresh feed. Solids from earlier stages were conducted by gravity feed from locking valves at the bottom of the cyclones to the next flash heating stage.

The process was controlled to provide an average gas velocity in the flash calciner of 6 metres per second for an incoming gas temperature of 660C., a calciner exit gas temperature of 585C., and an average temperature of about 610C., and for a water vapour pressure in incoming gas of 20 kPa. The preheated material fed to the flash calciner contained 7.0% of chemically bound water, and was at a temperature of approximately 415C. The gas residence time in the flash calciner was calculated as less than 1 second. The product was not substantially different in properties from the products of calcination described in Example 2, having an extractability above 88%.

The process conditions and product properties were maintained for more than 24 hours of continuous running (i.e. for about 150,000 flash calcination cycles).

From this test it was possible to obtain design parameters for a scaled up unit treating above 1 million tonnes per year of the bauxite feed.

What is claimed is:

1. A process for the treatment of a Bayer process feedstock prior to transferring the treated feedstock to a Bayer process for extracting refined alumina from the treated feedstock, which treatment process includes the following steps:
   (a) heating the Bayer process feedstock to a temperature of 400° C. to 650° C. by direct contact with combustion gases, and
   b) cooling the heated feedstock to a temperature at which said heated feedstock is suitable for being handled and fed to the Bayer process,
   and which treatment process comprises controlling the contact time of the feedstock at temperatures in the range set forth in step (a) above to ensure decomposition of alumina trihydrate and alumina monohydrate present, by dehydration, while not:
       (i) forming alumina monohydrate from alumina trihydrate, or
       (ii) reducing residual bound water such that extraction is adversely affected, or
       (iii) allowing sufficient time for contact with water vapour that a slower, water vapour-dependent loss of extractability is experienced.

2. The treatment process defined in claim 1 wherein the contact time in step (a) is less than five minutes.

3. The treatment process defined in claim 1 wherein the contact time in step (a) is less than one minute.

4. The treatment process defined in claim 1 wherein the contact time in step (a) is less than 10 seconds.

5. The treatment process defined in claim 1 includes milling the feedstock prior to supplying the feedstock to step (a).

6. The treatment process defined in claim 1 wherein the feedstock supplied to step (a) contains no more than 5% by weight of material which would be retained on a 5 mm aperture.

7. The treatment process defined in claim 1 wherein the feedstock supplied to step (a) contains no more than 5% by weight of material which would be retained on a 2 mm aperture.

8. The treatment process defined in claim 1 wherein the feedstock supplied to step (a) contains no more than 5% by weight of material which would be retained on a 1 mm aperture.

9. The treatment process defined in claim 1 wherein the feedstock supplied to step (a) contains no more than 30% by weight of a material which would pass a 20 micron aperture.

10. The treatment process defined in claim 1 wherein the feedstock contains no more than 20% by weight of material which would pass a 20 micron aperture.

11. The treatment process defined in claim 1 wherein the feedstock contains no more than 10% by weight of material which would pass a 20 micron aperture.

12. The treatment process defined in claim 1 further comprising preheating the feedstock prior to supplying the feedstock to step (a).

13. The treatment process defined in claim 1, further comprising dividing the feedstock on the basis of temperature sensitivity or water vapour sensitivity and selectively introducing the divided feedstock streams into step (a).

14. The treatment process defined in claim 13 further comprising introducing an alumina trihydrate fraction of the feedstock into step (a) where the combustion gases are at a sufficiently low temperature that there is a lower potential of loss of extractability as compared with the use of hotter gases to decompose the alumina trihydrate in this fraction.

15. The treatment process defined in claim 1 further comprising producing the combustion gas used in step (a) in excess air and supplying to step (a) the combustion gas and air.

16. The treatment process defined in claim 1 wherein step (a) includes heating the feedstock to the temperature of 400° C. to 650° C. by direct contact with combustion gases and air.

17. A Bayer process for extracting refined alumina from a Bayer process feedstock, which Bayer process includes a treatment process for treating the feedstock prior to extracting refined alumina from treated feedstock, which treatment process includes the following steps:
   (a) heating the Bayer process feedstock to a temperature of 400° C. to 650° C. by direct contact with combustion gases, and
   (b) cooling the heated feedstock to a temperature at which said heated feedstock is suitable for being handled and fed to the Bayer process, and which treatment process comprises controlling the contact time of the feedstock at temperatures in the range set forth in step (a) above to ensure decomposition of alumina trihydrate and alumina monohydrate present, by dehydration, while not:
       (i) forming alumina monohydrate from alumina trihydrate, or
       (ii) reducing residual bound water such that extraction is adversely affected, or
       (iii) allowing sufficient time for contact with water vapour that a slower, water vapour-dependent loss of extractability is experienced.

18. The Bayer process defined in claim 17 wherein the contact time in step (a) is less than five minutes.

19. The Bayer process defined in claim 17 wherein the contact time in step (a) is less than one minute.

20. The Bayer process defined in claim 17 wherein the contact time in step (a) is less than 10 seconds.

21. The Bayer process defined in claim 18 wherein the treatment process includes milling the feedstock prior to supplying the feedstock to step (a).

22. The Bayer process defined in claim 18 wherein the feedstock supplied to step (a) contains no more than 5% by weight of material which would be retained on a 2 mm aperture.

23. The Bayer process defined in claim 18 wherein the feedstock supplied to step (a) contains no more than 5% by weight of material which would be retained on a 2 mm aperture.

24. The Bayer process defined in claim 18 wherein the feedstock supplied to step (a) contains no more than 5% by weight of material which would be retained on a 1 mm aperture.

25. The Bayer process defined in claim 18 wherein the feedstock supplied to step (a) contains no more than 30% by weight of a material which would pass a 20 micron aperture.

26. The Bayer process defined in claim 18 wherein the feedstock contains no more than 20% by weight of material which would pass a 20 micron aperture.

27. The Bayer process defined in claim 18 wherein the feedstock contains no more than 10% by weight of material which would pass a 20 micron aperture.

28. The Bayer process defined in claim 18 wherein the treatment process includes preheating the feedstock prior to supplying the feedstock to step (a).

29. The Bayer process defined in claim 18 wherein the treatment process includes dividing the feedstock on the basis of temperature sensitivity or water vapour sensitivity and selectively introducing the divided feedstock streams into step (a).

30. The Bayer process defined in claim 29 wherein the treatment process includes introducing an alumina trihydrate fraction of the feedstock into step (a) where the combustion gases are at a sufficiently low temperature that there is a lower potential of loss of extractability as compared with the use of hotter gases to decompose the alumina trihydrate in this fraction.

31. The Bayer process defined in claim 18 wherein the treatment process includes producing the combustion gas used in step (a) in excess air and supplying to step (a) the combustion gas and air.

32. The Bayer process defined in claim 18 wherein step (a) includes heating the feedstock to the temperature of 400C. to 650C. by direct contact with combustion gases and air.

* * * * *

UNITED STATES PATENT AND TRADEMARK OFFICE
CERTIFICATE OF CORRECTION

PATENT NO. : 6,616,902 B1 Page 1 of 1
DATED : September 9, 2003
INVENTOR(S) : Michael Hollitt et al.

It is certified that error appears in the above-identified patent and that said Letters Patent is hereby corrected as shown below:

Title page,
Item [30], Foreign Application Priority Data, "Aug. 1, 1998" should be corrected to read -- August 17, 1998 --

Column 14,
Line 49, "2 mm" should read -- 5 mm --

Signed and Sealed this

Fourth Day of May, 2004

JON W. DUDAS
*Acting Director of the United States Patent and Trademark Office*